(12) United States Patent
Sakuma et al.

(10) Patent No.: US 6,548,980 B1
(45) Date of Patent: Apr. 15, 2003

(54) MOTOR DRIVE

(75) Inventors: Yoichi Sakuma, Kyoto (JP); Atsushi Kawano, Kyoto (JP)

(73) Assignee: Omron Corporation, Kyoto (JP)

( * ) Notice: Subject to any disclaimer, the term of this patent is extended or adjusted under 35 U.S.C. 154(b) by 0 days.

(21) Appl. No.: 09/868,170

(22) PCT Filed: Nov. 30, 1999

(86) PCT No.: PCT/JP99/06694

§ 371 (c)(1),
(2), (4) Date: Jun. 15, 2001

(87) PCT Pub. No.: WO00/37761

PCT Pub. Date: Jun. 29, 2000

(30) Foreign Application Priority Data

Dec. 18, 1998 (JP) .......................................... 10-360660

(51) Int. Cl.⁷ ................................................. G05B 5/00

(52) U.S. Cl. ...................... 318/482; 318/264; 318/265; 318/280; 318/283; 318/281; 318/286; 318/282

(58) Field of Search ................................. 318/264, 265, 318/280, 283, 281, 482, 284, 286, 282

(56) References Cited

U.S. PATENT DOCUMENTS 6,060,794 A * 5/2000 Takagi et al. ................ 318/280
6,157,152 A * 12/2000 Sekine et al. ................ 318/266
6,230,838 B1 * 5/2001 Adams ........................ 180/271
6,281,647 B1 * 8/2001 Sasaki ......................... 318/264

FOREIGN PATENT DOCUMENTS

JP         10-299337         11/1998

* cited by examiner

*Primary Examiner*—Karen Masih
(74) *Attorney, Agent, or Firm*—Foley & Lardner

(57) ABSTRACT

An apparatus for driving a motor that opens and closes the window of vehicle, for example, is so adapted that when the vehicle becomes submersed in the sea, a lake or a river, etc., the window is prevented from being closed owing to malfunctioning of a relay caused when a leakage current flows into an operating switch for opening and closing the window. When submersion is sensed and it is sensed that the motor is being rotated by a malfunction in a direction that closes the window, a relay for rotating the motor in the forward direction is actuated. This prevents the occurrence of a situation in which the motor is caused to rotate (especially in the direction that closes the window) regardless of the fact that the operating switch has not been operated.

10 Claims, 8 Drawing Sheets

MOTOR DRIVE

TECHNICAL FIELD

This invention relates to a motor drive apparatus, e.g., the drive apparatus of a motor for opening and closing the power window of a vehicle.

BACKGROUND ART

A mechanism (power window) for opening and closing a window by the driving force of a motor is employed in many vehicles. Though one such mechanism which controls the forward and reverse rotation of the motor (the opening and closing of the window) directly by an operating switch is available, a variety of electronically controlled power window systems have recently come into widespread use. For example, one mechanism is such that if a foreign object of some kind becomes caught between the window frame and the window glass when the window is being closed, this is sensed and control is carried out to reverse the rotation of the motor and open the window. Another such mechanism remotely controls the opening and closing of the window by wireless communication.

In any case, many systems use relays to drive the window opening and closing motor in the forward and reverse directions and to halt the rotation thereof. Consequently, if an accident occurs in which the vehicle falls into the sea or into a river and sinks, the motor may be actuated, owing to malfunction of the relays, regardless of the fact that neither operation of the switch nor electronic control is carried out. For example, if the motor rotates in the reverse direction and the window closes, the driver and any passengers will become trapped inside the vehicle.

A motor drive apparatus using relays for the power window of a vehicle according to the prior art will be described with reference to FIG. 6a.

The window of a vehicle is opened and closed by the rotation of a motor 1. There are provided a relay 2 for rotating the motor 1 in the forward direction (to open, i.e., lower, the window), and a relay 3 for rotating the motor 1 in the reverse direction (to close, i.e., raise, the window).

The relay 2 includes a relay coil 2a and relay contacts 2b. The relay contacts 2b include a normally open contact (make contact or a contact) NO and a normally closed contact (break contact or b contact) NC. The relay 3 includes a relay coil 3a and relay contacts 3b. The relay contacts 3b includes a normally open contact NO and a normally closed contact NC.

The contacts (or terminals) NO of these relay contacts 2b, 3b are connected to the line of a power supply E1, and the contacts (or terminals) NC of these relay contacts are connected to ground. Common terminals C of these relay contacts 2b, 3b are connected to positive and negative terminals ma, mb, respectively, of the motor 1. The motor rotates forward when a positive voltage is applied to the terminal ma and in reverse when a positive voltage is applied to the terminal mb.

The relay coil 2a of relay 2 is connected between the line of a power supply E2 and ground and in series with a window-opening operating switch 4. Similarly, the relay coil 3a of relay 3 is connected between the line of the power supply E2 and ground and in series with a window-closing operating switch 5.

The two operating switches 4, 5 are illustrated as being separately provided as operating switches. In actuality, however, the switches 4 and 5 usually are equipped with a common operating knob capable of being rocked back and forth. The structure used is such that the switch 4 is turned on when the knob is swung in one direction and the switch 5 is turned on when the knob is swung in the other direction.

Single-pole, double-throw contacts (transfer contacts or break-make contacts) are illustrated as the relay contacts 2b, 3b. It goes without saying, however, that the apparatus may have parallel-connected normally open contacts NO and normally closed contacts NC, as shown in FIG. 6b.

If the operating switch 4 is turned on, the relay coil 2a is energized to actuate the relay contacts 2b. The common terminal C in the relay contacts 2b is connected to the normally open contact NO and separates from the normally closed contact NC. Accordingly, current flows from the line of power supply E1 to the positive terminal ma of motor 1 through the normally open contact NO and common terminal C of the relay contacts 2b, and current that flows out of the negative terminal mb of motor 1 flows to ground through the common terminal C and normally closed contact NC of relay contacts 3b. As a result, the motor 1 rotates in the forward direction and the window is opened. When the operating switch 5 is turned on, current from the power supply E1 flows to ground through the contacts 3b, motor 1 and contacts 2b, so that the motor 1 rotates in the reverse direction and the window is closed.

The above-described motor drive apparatus is such that energization of the relay coils 2a, 3a is controlled directly by turning the operating switches 4, 5 on and off. There is also an apparatus of the type in which the states of operating switches are judged by a single-chip microcomputer or the like and the energization of the relay coils is controlled based upon the judgment made.

FIG. 7 illustrates an example of a conventional motor drive circuit that relies upon such control by microcomputer. A controller (circuit) 13 typified by a microcomputer is provided in the diagram of FIG. 7. An operating switch 14 has a common terminal C and two normally open contacts NO1, NO2. Under ordinary conditions, the common terminal C is not connected to either the contact NO1 or the contact NO2. The common terminal C is connected to ground. A power-supply voltage E3 is applied on the contacts NO1, NO2 via pull-up resistors 15, 16, respectively. Under ordinary conditions, these voltages are applied to corresponding input ports of controller 13.

In comparison with the circuits of FIGS. 6a and 6b, the circuit of FIG. 7 has relay control transistors 11, 12 instead of the operating switches 4, 5 connected in series with the relay coils 2a, 3a, respectively. The control terminals 11, 12 are on/off controlled by the controller 13. Under ordinary conditions, these transistors 11, 12 are held in the off state.

If an operating knob is moved or swung in one direction so that the contact NO1 of operating switch 14 is connected to the common terminal C, the contact NO1 is brought to ground level. The ground-level voltage is sensed by the controller 13. The controller 13 outputs a control signal (H level) that turns on the transistor 11, and the relay coil 2a is energized to rotate the motor 1 in the forward direction. If the operating knob is swung in the other direction, the contact NO2 of operating switch 14 is connected to the common terminal C. The controller 13 senses the ground level at the contact NO2 and outputs a control signal that turns on the transistor 12, as a result of which the relay coil 3a is energized to rotate the motor 1 in the reverse direction.

The above-described motor drive apparatuses are such that if the vehicle falls into the sea, a lake or a river and the apparatus becomes submersed, there is a possibility that a phenomenon (so-called leakage) will occur in which, depending upon the quality of the water, a current flows into either contact of the operating switches (switches 4, 5 or switch 14) despite the fact that the operating knob has not been operated. As a consequence, there is the possibility that problems will arise, such as the motor 1 being rotated in the forward or reverse direction, the reversely rotating motor being stopped or control over the motor being lost, regardless of the fact that the operating knob has not been operated.

In general, a relay has a hysteresis characteristic, in which the voltage for actuating the relay (the voltage, which shall be referred to as the "actuating voltage", applied to a relay coil in order to turn on a normally open contact or turn off a normally closed contact) is higher than the voltage (which shall be referred to as the "restoration voltage") for returning the relay to the ordinary state. That is, if a voltage that exceeds the actuating voltage is applied to the relay coil, the relay is actuated; when the applied voltage falls below the restoration voltage, the relay returns to the original state. Further, there is a variation in the actuating voltage or restoration voltage from one relay to another. In other words, even if relays of the same type are used, the actuating voltage and restoration voltage thereof differ slightly depending upon the individual relay.

Undesirable phenomena that can occur if a vehicle (strictly speaking, the portion of the motor drive apparatus in which the relays or switches, etc., are placed) is submersed will be described keeping the above-mentioned facts in mind.

If leakage develops across the ends of operating switch 4 or 5 in FIG. 6a, this is equivalent to a resistor (referred to as a "leakage resistor") being connected in parallel with the operating switch. Such a situation is illustrated in FIG. 8. Here an operating switch SW is the operating switch 4 or 5, and a relay coil CL is the relay coil 2a or 3a. The power-supply voltage is represented by the character E, and a leakage resistor is represented by the characters RL. Since leakage current flows through the resistor RL, a coil voltage VCL is produced across the relay coil CL. The coil voltage VCL changes in dependence upon the state of submersion (impurities contained in the water) and becomes extremely unstable.

If the coil voltage VCL resulting from leakage is higher than the actuating voltage of the relay, a phenomenon occurs in which the relay is actuated to rotate the motor despite the fact that the operating switch has not been operated. For example, if the actuating voltage of the relay 2 for opening the window is higher than the actuating voltage of the relay 3 for closing the window and the coil voltage VCL due to leakage is between the actuating voltages of the two relays 2, 3, then only relay 3 will be actuated and the window will close. If the window closes, this will impede the escape of passengers from the submersed vehicle.

In a case where the coil voltage VCL due to leakage is higher than the actuating voltages of both the relays 2 and 3, both of the relays 2 and 3 are actuated. Since the normally open contacts NO in the relay contacts 2b, 3b of the relays 2, 3 are both turned on, the power-supply voltage E1 is impressed across the motor 1 and the motor 1 does not rotate. Even if the operating switch 4 or 5 is turned on under these conditions, the motor 1 will not rotate. Thus the operating switches have absolutely no effect.

If the coil voltage VCL due leakage declines and falls below the restoration voltage of either of the relays 2, 3 under these conditions, this relay is restored. Since the other relay is not restored and remains actuated, the motor 1 rotates in the forward or reverse direction. For example, if the restoration voltage of relay 2 is higher than the restoration voltage of relay 3, only relay 2 is restored and the motor 1 rotates in the reverse direction, as a result of which the window is closed.

Further, if a submersion accident occurs and the coil voltage VCL due to leakage surpasses the restoration voltage of the relay 3 when one of the operating switches, e.g., the operating switch 5, has been turned on by the driver or by a passenger to close the window, the relay 3 continues to operate so as to close the window even if the operating switch 5 is turned off.

These undesirably phenomena can occur in the circuit of FIG. 7 as well. The operating switch 14 develops leakage owing to submersion, a current flows to ground through the resistor 15 and contact NO1, and a current flows to ground through the resistor 16 and contact NO2. The voltages that appear at the contacts NO1 and NO2 are sensed by the controller 13. If the controller 13 recognizes that the voltage at contact NO1 or NO2 or the voltages at both of these contacts is/are less than a threshold voltage level, the controller outputs a control signal that turns on the transistor 11 or 12 or both of these transistors. As a result, the motor 1 rotates in the forward direction or reverse direction or a state is attained in which the motor cannot be controlled by the operating switch 14.

Though it is considered that the foregoing problems will be solved by adopting a waterproof structure for the operating switches, this is not easy to accomplish in actual practice. The reason is that it is difficult technically to adopt a waterproof structure solely for the switch contacts while maintaining the operating knob of the operating switches in a rockable state and exposing a portion of the knob. Even if achieving this is feasible, an increase in cost results.

DISCLOSURE OF THE INVENTION

An object of the present invention is to prevent the occurrence of a situation in which the motor operates against the will of the operator owing to relay malfunction caused by submersion in water.

Another object of the present invention is to so arrange it that a motor is made to operate in accordance with the will of the operator even if a submersion accident occurs.

A motor drive apparatus according to the present invention has a relay mainly for operating to rotate a motor in a forward direction, and a relay mainly for operating to rotate a motor in a reverse direction. A motor forward-rotation command or reverse-rotation command is applied by an operator through an operating portion (operating knob, operating switch, etc.). The forward-rotation relay or reverse-rotation relay is actuated in response to the forward-rotation command or reverse-rotation command (e.g., directly in response to the operating switch being turned on or off, or through a microprocessor or other control circuit), thereby causing the motor to rotate in the forward or reverse direction.

In accordance with the present invention, the motor drive apparatus has submersion sensing means for sensing that at least an operating portion of the motor drive apparatus has become submersed; first malfunction sensing means for sensing that one relay of the above-mentioned relays, which is for rotating the motor in a predetermined one direction, has been actuated; and first forcible control means for actuating the other relay in response to submersion being sensed by the submersion sensing means and actuation of the one relay being sensed by the first malfunction sensing means.

If submersion is sensed and actuation of the one relay is sensed, then the other relay also is actuated by the first forcible control means. Since the relay for forward rotation of the motor and the relay for reverse rotation of the motor are both actuated, the motor ultimately assumes a state in which in will not rotate in either the forward or reverse direction (e.g., a state in which the same potentials appear at both ends of the motor). This makes it possible to prevent the occurrence of a situation in which the motor rotates in one direction against the will of the operator owing to malfunction of one relay caused by submersion.

A pair of the malfunction sensing means and a pair of the forcible control means may be provided. Specifically, the motor drive apparatus according to the present invention further includes second malfunction sensing means for sensing that the other relay has been actuated, and second forcible control means for actuating the one relay in response to submersion being sensed by the submersion sensing means and actuation of the other relay being sensed by the second malfunction sensing means.

This makes it possible to prevent the occurrence of a situation in which the motor rotates in the other direction owing to malfunction of the other relay caused by submersion.

The submersion sensing means and malfunction sensing means can also be implemented by a single means, as will be described later.

In a preferred embodiment of the present invention, there is provided a shorting circuit for establishing a short circuit across a relay coil of the relay that rotates the motor in the one direction, in operative association with manipulation of the operating portion so as to generate a command that rotates the motor in the other direction.

By virtue of the shorting circuit, the ends of one malfunctioning relay are shorted, as a result of which this relay is restored to the ordinary state. Accordingly, when the operator applies a command that actuates the other relay, only this other relay is actuated (or has already been actuated by the forcible control means) and the motor runs in accordance with the will of operator.

The present invention can also be expressed in the followed manner: Specifically, the present invention provides a motor drive apparatus having two relays for rotating a motor in a forward or reverse direction by supplying power to the motor, wherein the relays are actuated to rotate the motor in the forward or reverse direction in accordance with the operating state of an operating portion that is for commanding forward or reverse rotation of the motor, characterized by having submersion malfunction sensing means for outputting a submersion malfunction detection signal upon sensing that the motor drive apparatus has become submersed and that one relay of the above-mentioned relays, which is for rotating the motor in one direction, has been actuated; and forcible control means for energizing a relay coil that is for actuating the other of the above-mentioned relays, irrespective of the operating state of the operating portion, in response to output of the submersion malfunction detection signal.

The submersion malfunction sensing means outputs the submersion malfunction detection signal upon sensing that the motor drive apparatus has become submersed and that one relay, which is for rotating the motor in one direction, has been actuated. If the submersion malfunction detection signal is output, the forcible control means energizes a relay coil in order to actuate the other relay regardless of the operating state of the operating portion.

If a relay malfunctions owing to leakage brought about by submersion, the submersion malfunction detection signal is output and the other relay also is actuated by being energized by the forcible control means. Both relays ultimately are actuated, therefore, to establish a state in which the motor cannot rotate in either direction. Accordingly, it is possible to prevent, with a high degree of reliability, the occurrence of a situation in which the motor rotates in either direction against the will of the operator owing to malfunction of only one of the relays caused by leakage resulting from submersion.

The present invention can be expressed all-inclusively as follows: Specifically, the present invention provides a motor drive apparatus having two relays for rotating a motor in a forward or reverse direction by supplying power to the motor, wherein the relays are actuated to rotate the motor in the forward or reverse direction in accordance with the operating state of an operating portion that is for commanding forward or reverse rotation of the motor, characterized by having submersion sensing means for outputting a submersion detection signal upon sensing that the motor drive apparatus has become submersed; and forcible control means for actuating both of the relays, irrespective of the operating state of the operating portion, in response to output of the submersion detection signal.

The submersion sensing means outputs the submersion detection signal upon sensing that the motor drive apparatus has become submersed. If the submersion detection signal is output, the forcible control means energizes both of the relay coils regardless of the operating state of the operating portion. If a submersion accident occurs, therefore, the submersion detection signal is output, both relays are actuated by forcible control exercises by the forcible control means and the end result is that a state in which the motor cannot rotate in either direction is established. Accordingly, it is possible to prevent, with a high degree of reliability, the occurrence of a situation in which the motor rotates in either direction owing to actuation of only one of the relays caused by leakage resulting from submersion.

In an embodiment, the motor is a motor for driving an opening and closing body of a vehicle. By applying the motor drive apparatus of the present invention to a motor that drives an opening and closing body (a power window or sunroof, etc.) of a vehicle, a malfunction in which the opening and closing body is actuated against the will of a passenger is prevented even in the event of an accident in which the vehicle becomes submersed.

According to another embodiment, rotation of the motor in one direction is rotation in a direction that closes the opening and closing body, and rotation of the motor in the other direction is rotation in a direction that opens the opening and closing body.

In the case of the direction in which a relay coil forcibly actuated by the forcible control means opens the opening and closing body of the vehicle, a malfunction especially in a direction in which the opening and closing body of the vehicle is closed is prevented. This makes it possible to maintain the opening and closing body in the open state reliably even in a case where a vehicle submersion accident has occurred. This enables the passengers to escape from the passenger compartment easily, thereby enhancing the safety of the vehicle.

BEST MODE FOR CARRYING OUT THE INVENTION

Figure 1:
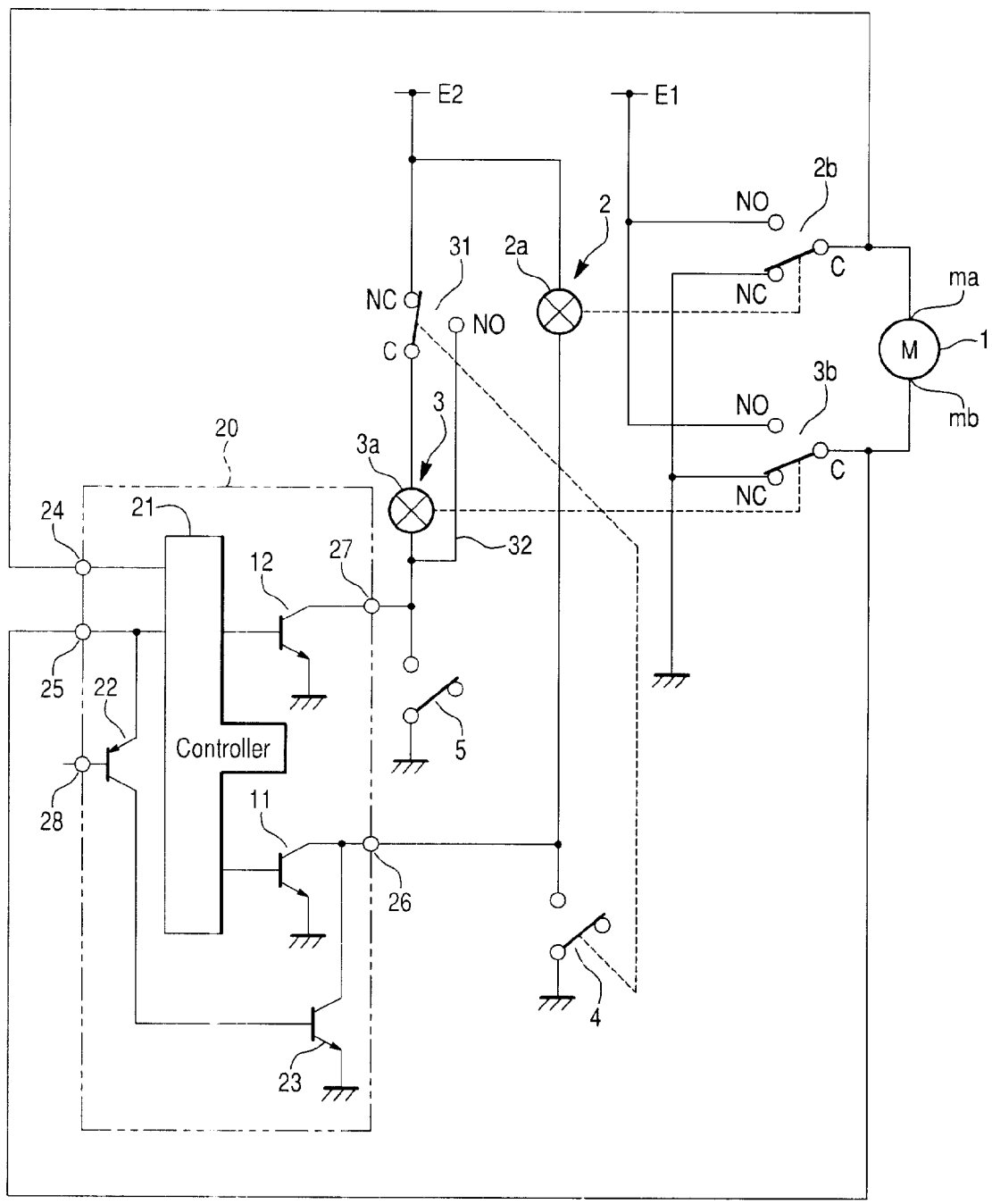
FIG. 1 is a circuit diagram of a motor drive apparatus according to a first embodiment.
Figure 6A:
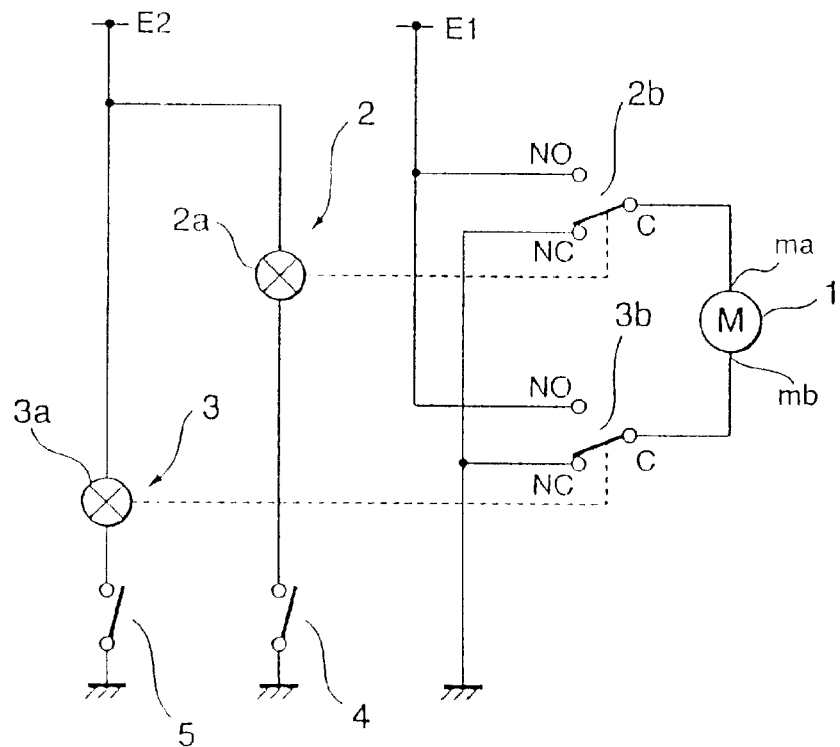
FIGS. 6a and 6b and FIG. 7 are circuit diagram illustrating a motor drive apparatus according to the prior art.
Figure 6B:
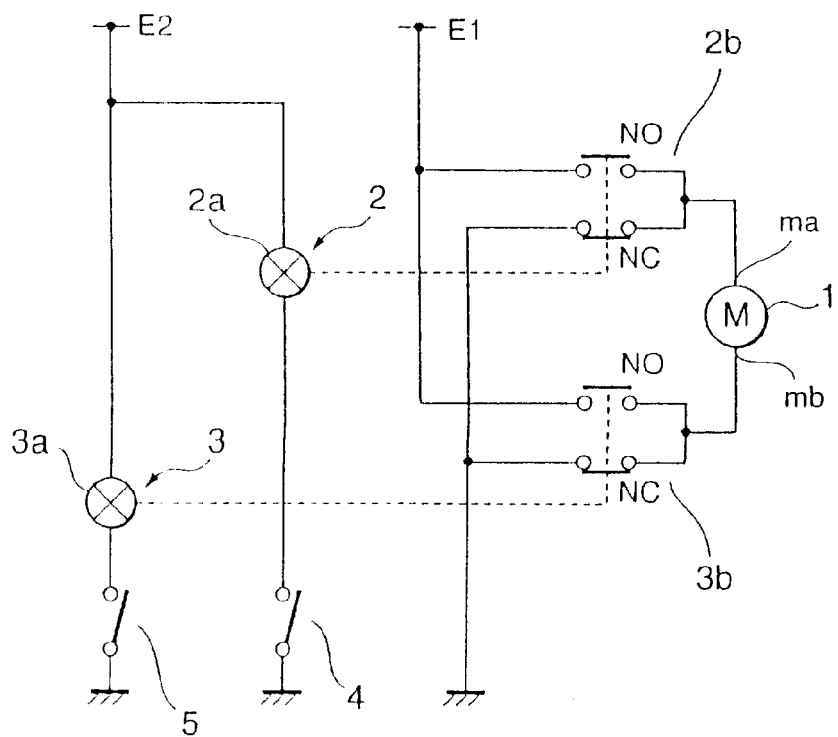
Figure 7:
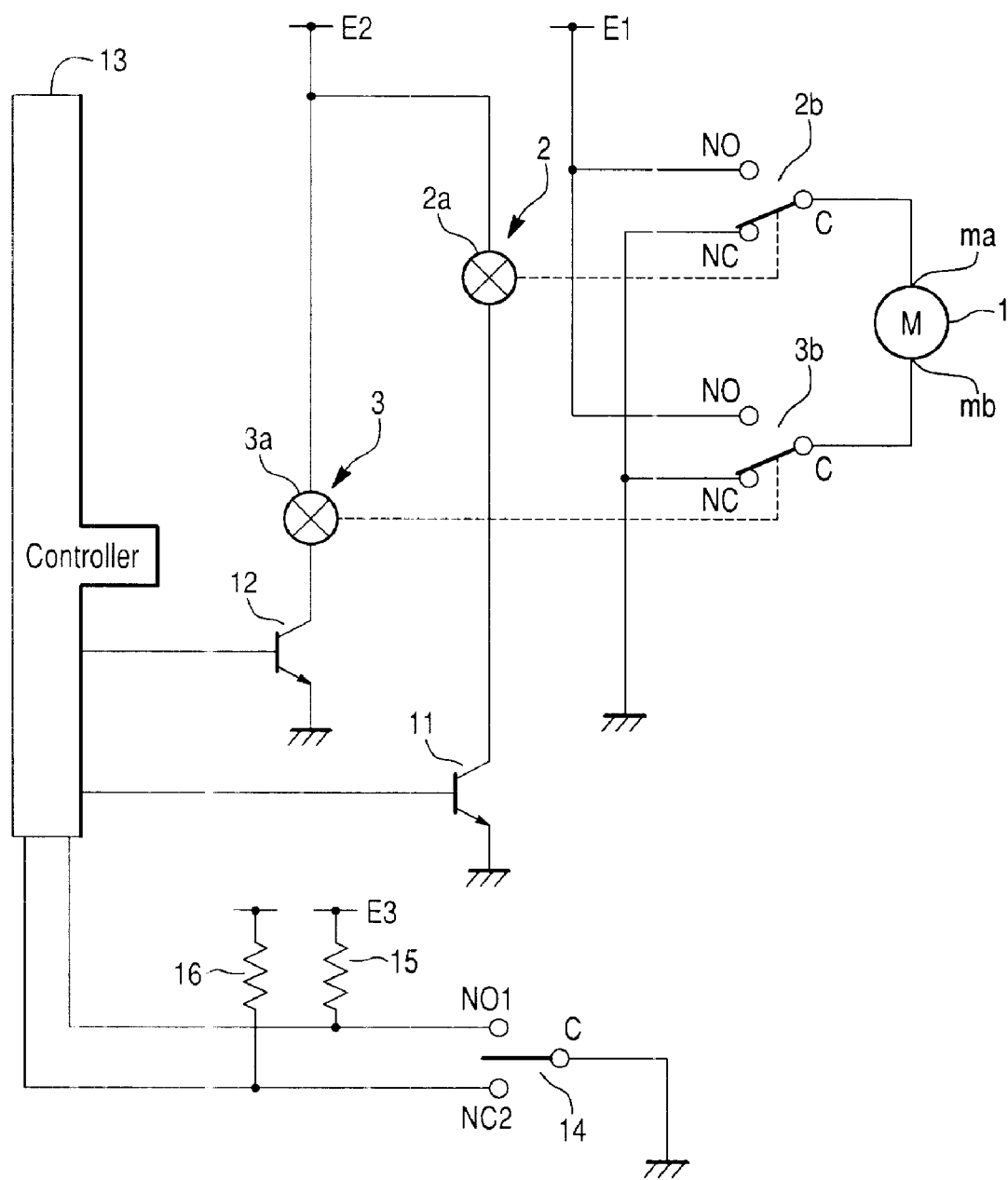
Figure 8:
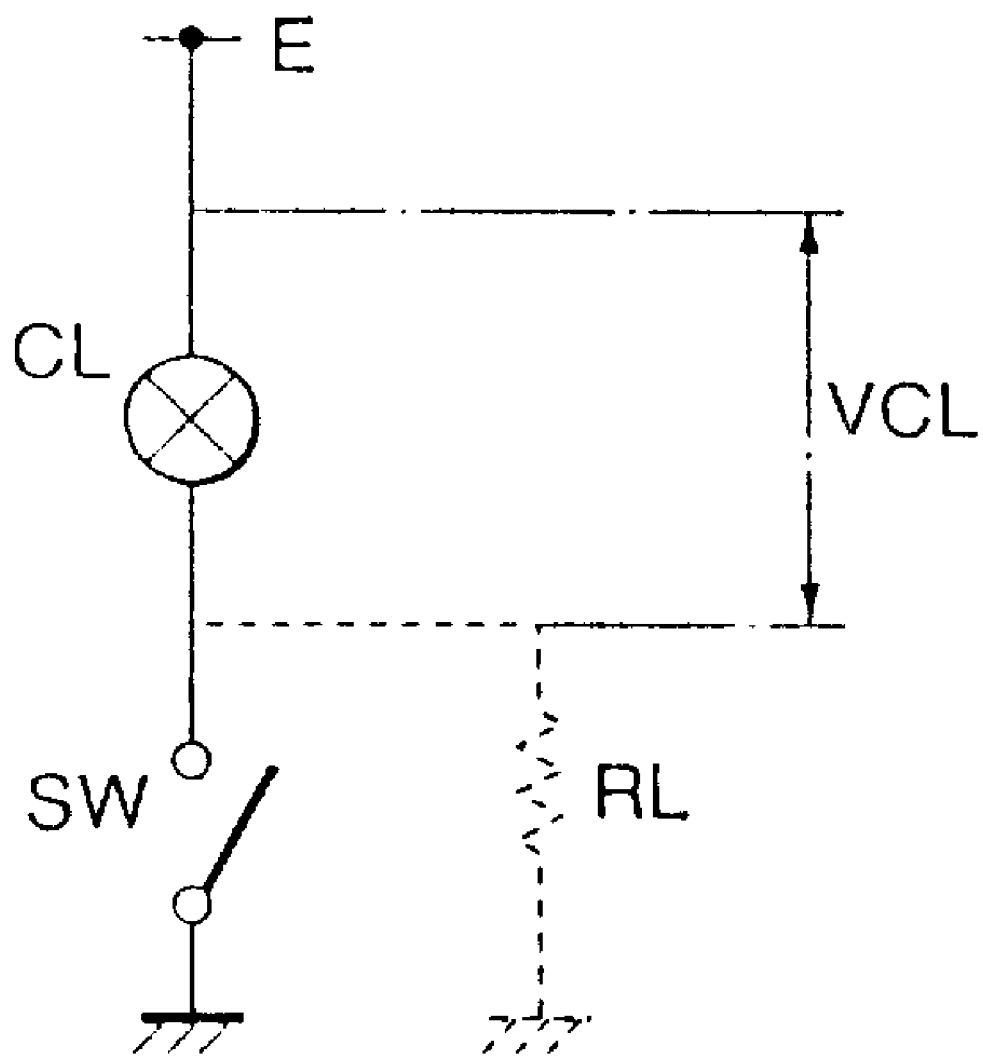
FIG. 8 is a circuit diagram illustrating the reason why a relay malfunction occurs owing to generation of leakage caused by submersion.

FIG. 1 illustrates a first embodiment of the present invention. Components identical with those shown in FIG. 6a and in FIG. 7 are designated by like reference characters and are not described again.

The above-described operating switch 4 and relay control transistor 11 are connected in parallel and so are the operating switch 5 and the relay control transistor 12. The transistors 11, 12 are on/off controlled by a controller 21.

The controller 21, which includes a microprocessor, for example, controls the automatic opening and closing of a power window, performs control to prevent an object from becoming caught in the power window and controls remote operation of the power window in accordance with an internal program.

An overview of automatic open/close control is as follows: the operating switch 4 or 5 is turned on in accordance with operation of the operating knob. A switch or contact (not shown) turns on in operative association with the operating switch 4 or 5. The fact that this switch or contact has been turned on is sensed by the controller 21. The latter turns on the transistor 11 or 12 based upon detection of the ON state. Accordingly, even if the operating switch 4 or 5 is turned off subsequently, the relay coil 2a or 3a continues to be energized and the motor 1 continues rotating (in the forward or reverse direction). The transistor 11 or 12 is held in the ON state until the window is opened or closed completely. The completely open or closed state of the window is sensed by a sensor or on the basis of the load (current or voltage) on the motor 1.

Control for preventing an object from becoming caught in the window is executed when the motor 1 is rotating in the reverse direction to close the window. When the motor 1 is being rotated in the reverse direction, the power-supply voltage E1 is impressed upon the terminal mb of the motor 1 and the terminal ma is at the ground level. Since these voltages at respective ends of the motor 1 are applied to the controller 21 via input ports (terminals) 25, 24, the controller 21 is capable of sensing that the motor 1 is at rest, rotating in the forward direction or rotating in the reverse direction. The fact that a foreign object is present between the window frame and the window glass (the fact that the object has become caught) is sensed based upon the rotating speed of the motor, the load (overload) on the motor, etc. If a caught object is sensed when the motor 1 is being rotated in the reverse direction, the controller 21 holds the transistor 12 in the OFF state and turns on the transistor 11. The relay 2, therefore, is actuated. If the operating switch 5 is turned off, the motor 1 is rotated in the forward direction. The controller 21 rotates the motor 1 forward a predetermined amount to thereby open the window a predetermined amount. When the operating switch 5 is in the ON state, the power-supply voltage E1 is impressed across the motor 1 and, hence, the motor 1 stops rotating.

An overview of control for remote operation is as follows: The apparatus is provided with a device (not shown) for receiving radio waves (or infrared radiation) from a remote controller. When a window open or close command is being transmitted from the remote controller, the controller 21 turns on the transistor 11 or 12 in accordance with this command, thereby opening or closing the window.

The control unit (circuit or device) 20 includes the above-mentioned controller 21, control transistors 11, 12, a transistor 22 for sensing submersion and reverse rotation of the motor, and a transistor 23 for forcibly driving (rotating) the motor. The control unit 20, which is one type of hybrid IC, is provided with a waterproof structure by molding the controller 21 and transistors 11, 12, 22, 23 in plastic. The control unit 20 has the terminals 24, 25 connected to the ends ma, mb of motor 1, terminals 26, 27 for connecting the transistors 11, 12 in parallel with the operating switches 4, 5, and an open terminal 28 for sensing submersion. The open terminal 28 is exposed to the exterior of the molded surface. The open terminal 28 is provided at a location at which there is high likelihood that the terminal will be submersed at approximately the same time as the operating switches 4, 5. A lead wire may be laid from the terminal 28 to the vicinity of the operating switches 4, 5, in which case it is preferred that at least the tip of the lead wire be exposed (i.e., that the covering be removed from the tip).

The emitter of the transistor 22 is connected to the input terminal 25, the collector is connected to the base of the transistor 23 and the base is connected to the open terminal 28. The transistor 23 is connected in parallel with the transistor 11 (in parallel with the operating switch 4 via the terminal 26).

If the motor drive apparatus is submersed, so is the open terminal 28. A state is thus attained in which the open terminal 28 is connected to ground via the resistance component (leakage resistance) in water. When the motor 1 is rotating in the reverse direction, the power-supply voltage E1 is being applied to the terminal mb of the motor. The voltage E1 thus is being applied to the emitter of the transistor 22 through the terminal 25. Since the base of transistor 22 is connected to ground via the open terminal 28, the transistor 22 turns on. The transistor 22 performs two functions, namely sensing of reverse rotation of motor 1 and sensing of submersion.

If the transistor 22 is turned on, the base of transistor 23 attains the H level (a potential approximately equal to the power-supply voltage E1) and, hence, the transistor 23 turns on. The relay 2 is actuated as a result. The transistor 23 is for forcibly actuating the relay 2, which is for forward rotation of the motor (for forcibly driving the motor 1 in the forward direction).

Since the motor 1 was being rotated in the reverse direction by actuating the relay 3, the power-supply voltage E1 is being applied to the terminal mb of the motor 1, as set forth above. Since the relay 2 is forcibly actuated by detection of submersion under these conditions, the normally open contact NO of relay contact 2b and the common terminal C are connected. As a result, the power-supply voltage E1 is applied to the terminal ma of motor 1. The motor 1 stops rotating because both terminals ma and mb of the motor 1 take on the same potential. Thus, if submersion is sensed when the motor 1 is rotating in the reverse direction, the motor 1 ceases being driven.

According to this embodiment, a circuit is also provided to forcibly halting actuation of the relay 3 (if this relay is being actuated), which is for rotating the motor 1 in the reverse direction so as to close the window (the result of this operation being that the motor is rotated in the forward direction). This circuit is for the purpose of producing a short circuit across both ends of the relay coil 3*a* of relay 3 and includes a switch 31 and a shorting line 32. The switch 31, which is one type of changeover switch, has a common terminal C connected to one side (the power-supply side) of relay coil 3*a*, a normally closed terminal NC connected to the power supply E2, and a normally open contact NO connected to the other side (the ground side) of the relay coil 3*a* via the line 32. The switch 31 operates in association with the switch 4 that commands forward rotation of the motor 1. When the switch 4 is turned on, the switch 31 is changed over so as to connect the common terminal C to the normally open contact NO.

If the switch 4 is turned on by operating the operating knob in order to open the window, therefore, the ends of the relay coil 3*a* are shorted by the switch 31 and line 32. Accordingly, energization of the relay coil 3*a* ceases and the relay 3 (relay contact 3*b*) is restored to the ordinary state as a result. The motor 1 is rotated in the forward direction, to thereby open the window, by the forced actuation of relay 2 (by transistor 23 being turned on) in response to sensing of submersion or by actuation of relay 2 in response to the operating switch 4 being turned on.

Even if leakage caused by submersion occurs between the common terminal C and normally closed contact NC of the switch 31, the leakage current flows through the shorting line 32, the resistance of which is less than that of the relay coil 3*a*. As a consequence, almost no current flows into the relay coil 3*a* and the relay 3 is not actuated.

The danger that passengers of a vehicle will become trapped inside the vehicle arises when a relay malfunction caused by submersion is of the kind where the motor 1 is driven reversely in the direction in which the window closes. According to this embodiment, the relay 2 for rotating the motor 1 in the forward direction is forcibly actuated when a certain condition, i.e., detection of submersion and reverse rotation of the motor 1, is established. As a result, the power-supply voltage E1 is impressed across the terminals ma, mb of motor 1 and the motor 1 is stopped immediately. This prevents the occurrence of a highly dangerous situation in which the window moves in the closing direction owing to coil voltage produced by leakage that accompanies submersion.

Further, when the operating knob is operated in a direction to open the window (i.e., when switch 4 is turned on), the ends of the relay coil 3*a* for reverse rotation are shorted by the switch 31, which operates in association with the switch 4, and the shorting line 32. As a result, the relay contacts 3*b* are restored to the ordinary state. Because the relay 2 is actuated by turn-on of switch 4 (or because the relay 2 has been forcibly actuated based upon detection of submersion), the motor 1 is rotated in the forward direction and the window is opened. Even if the relay 3 for reverse rotation has been actuated owing to leakage, the relay 3 is restored and the window can be opened with assurance.

The motor 1 can be utilized to open and close not only a window but also various opening and closing bodies such as a sunroof.

Thus, in accordance with this embodiment, a malfunction in which an opening and closing body moves in a closing direction owing to a submersion accident can be prevented and a motor can be driven in the direction that opens the opening and closing body in response to manipulation of an operating switch.

According to this embodiment, there are merely provided the two transistors 22, 23 and the open terminal 28. The structure is therefore simple and the apparatus can be reduced in size and lowered in cost.

The controller 21 and transistors 11, 12 are for controlling the automatic opening and closing of a power window, performing control to prevent an object from becoming caught in the power window and controlling remote operation of the power window, as set forth above. Since these components are not necessarily required to prevent malfunction caused by a submersion accident, they can be omitted.

The inventors have performed submersion experiments using a motor drive apparatus having the circuitry shown in FIG. 1 and have confirmed that then drive apparatus operates in the manner described above.

Figure 2:
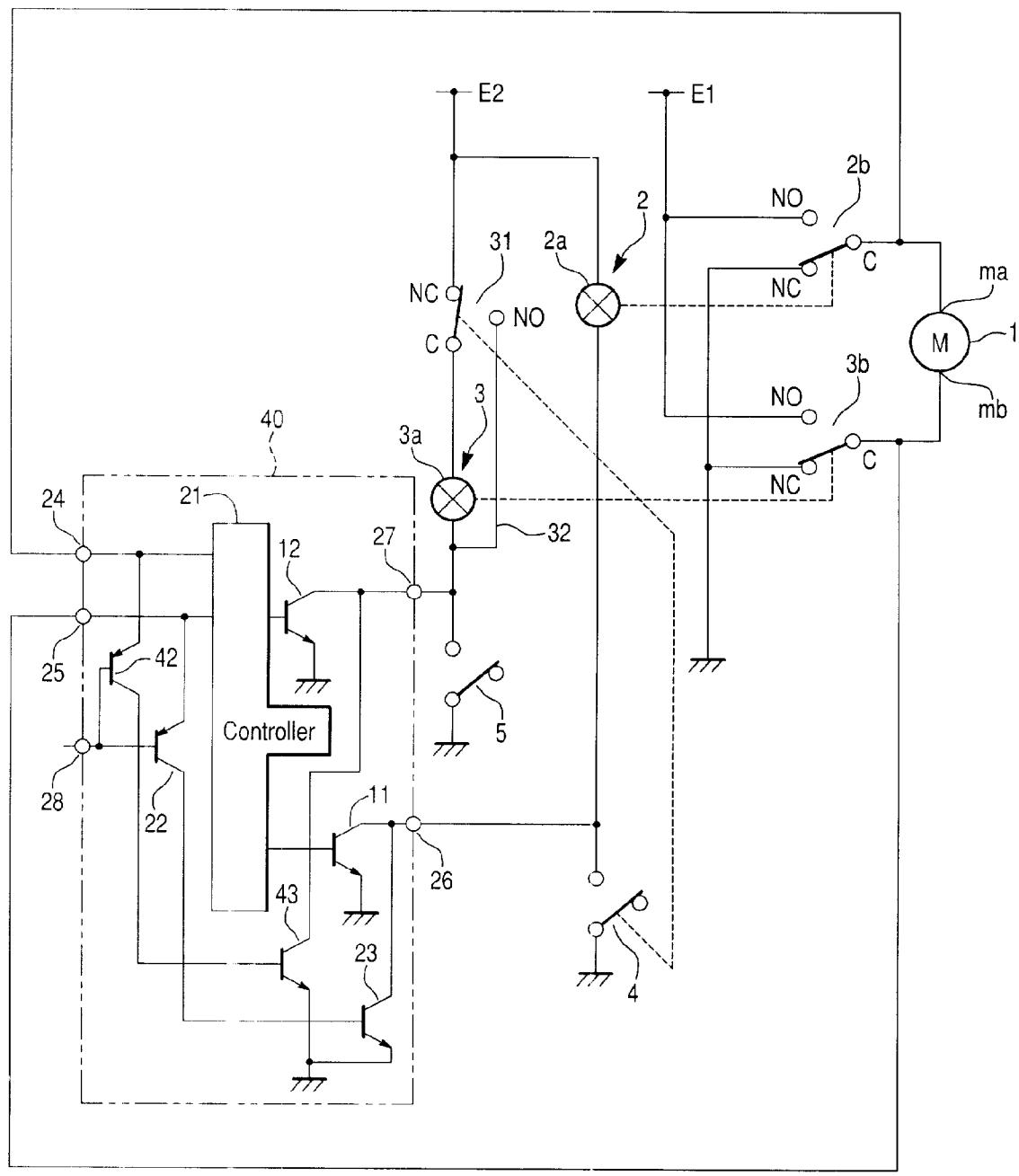
FIG. 2 is a circuit diagram of a motor drive apparatus according to a second embodiment.

FIG. 2 illustrates a second embodiment. Components in FIG. 2 identical with those shown in FIG. 1 are designated by like reference characters and are not described again.

The first embodiment prevents a malfunction in which the motor is rotated in a direction that closes the window owing to a coil voltage produced by leakage. The second embodiment, however, prevents not only a malfunction in which the motor is rotated (reversely) in a direction that closes the window but also a malfunction in which the motor is rotated (forwardly) in a direction that opens the window. To accomplish this, a control unit 40 is additionally provided with a transistor 42, which is for detecting submersion and forward rotation of the motor and is controlled by the potential at the open terminal 28, having its emitter connected to the terminal 24 to which the voltage at the terminal ma of the motor 1 is applied; and a transistor 43, which is for forcibly actuating a relay for reverse rotation of the motor, controlled by the transistor 42 and is connected in parallel with the reply control transistor 12.

As a result of submersion, the base of the transistor 42 is substantially grounded via the open terminal 28. If it is assumed that the power-supply voltage E1 was being applied to the terminal ma of motor 1 at this time (i.e., that the motor was being rotated in the forward direction), the transistor 42 will turn on. Since the transistor 43 also turns on as a result, a current flows into the relay coil 3*a* and the normally open contact NO of the relay contacts 3*b* is turned on. The potentials at both ends of the motor 1 therefore take on equal values E1 and the motor 1 stops.

Figure 3:
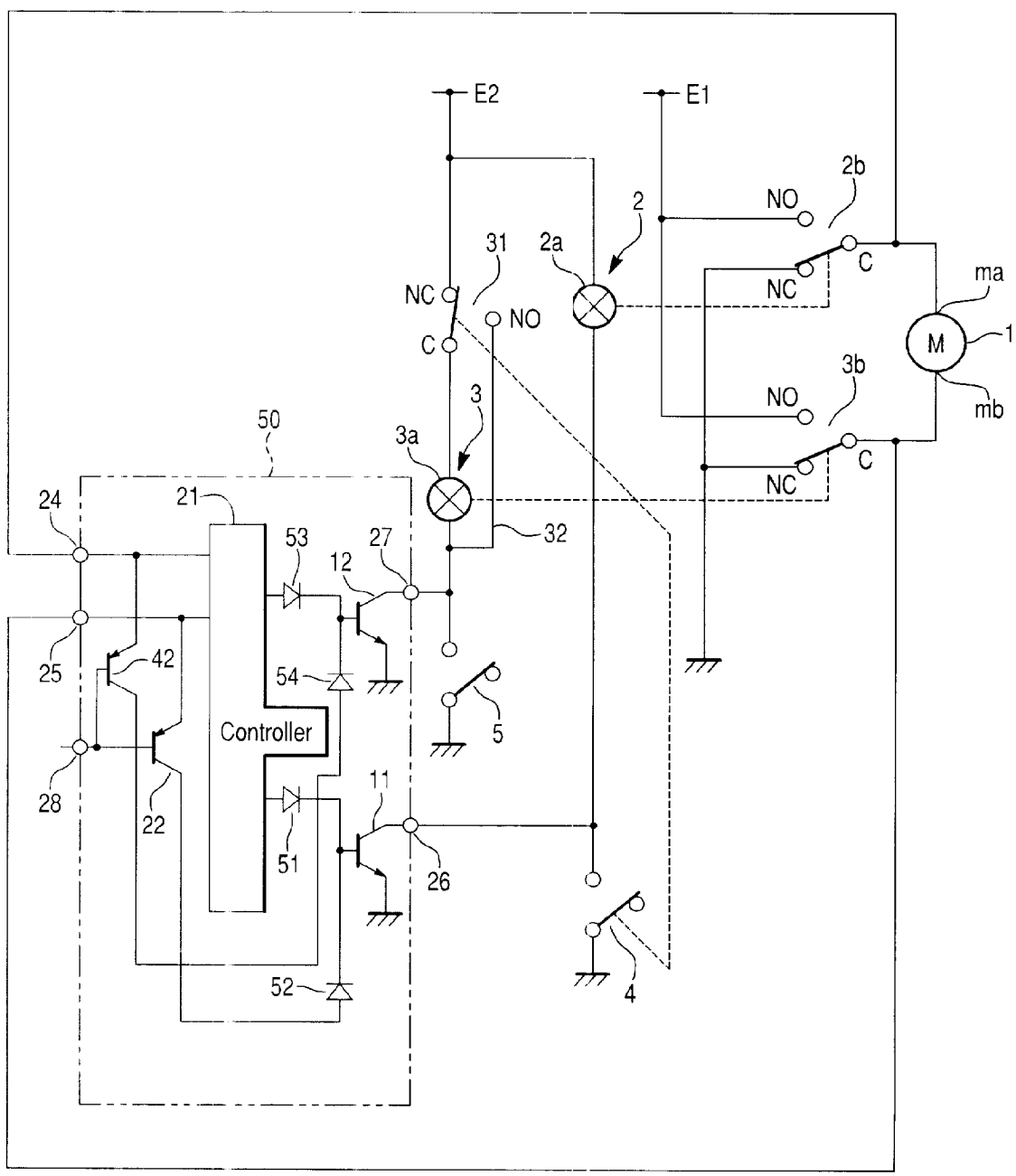
FIG. 3 is a circuit diagram illustrating a modification of the second embodiment.

In FIG. 2, a single transistor can perform the roles of both transistors 11 and 23, and the transistors 12 and 43 can be replaced by a single transistor. A circuit in which the number of transistors is thus reduced is illustrated in FIG. 3.

The base of the common transistor 11 in a control unit 50 is connected to the controller 21 and to the collector of the transistor 22 via reverse-current diodes 51, 52, respectively. Similarly, the base of the common transistor 12 is connected to the controller 21 and to the collector of the transistor 42 via reverse-current diodes 53, 54, respectively.

Figure 4:
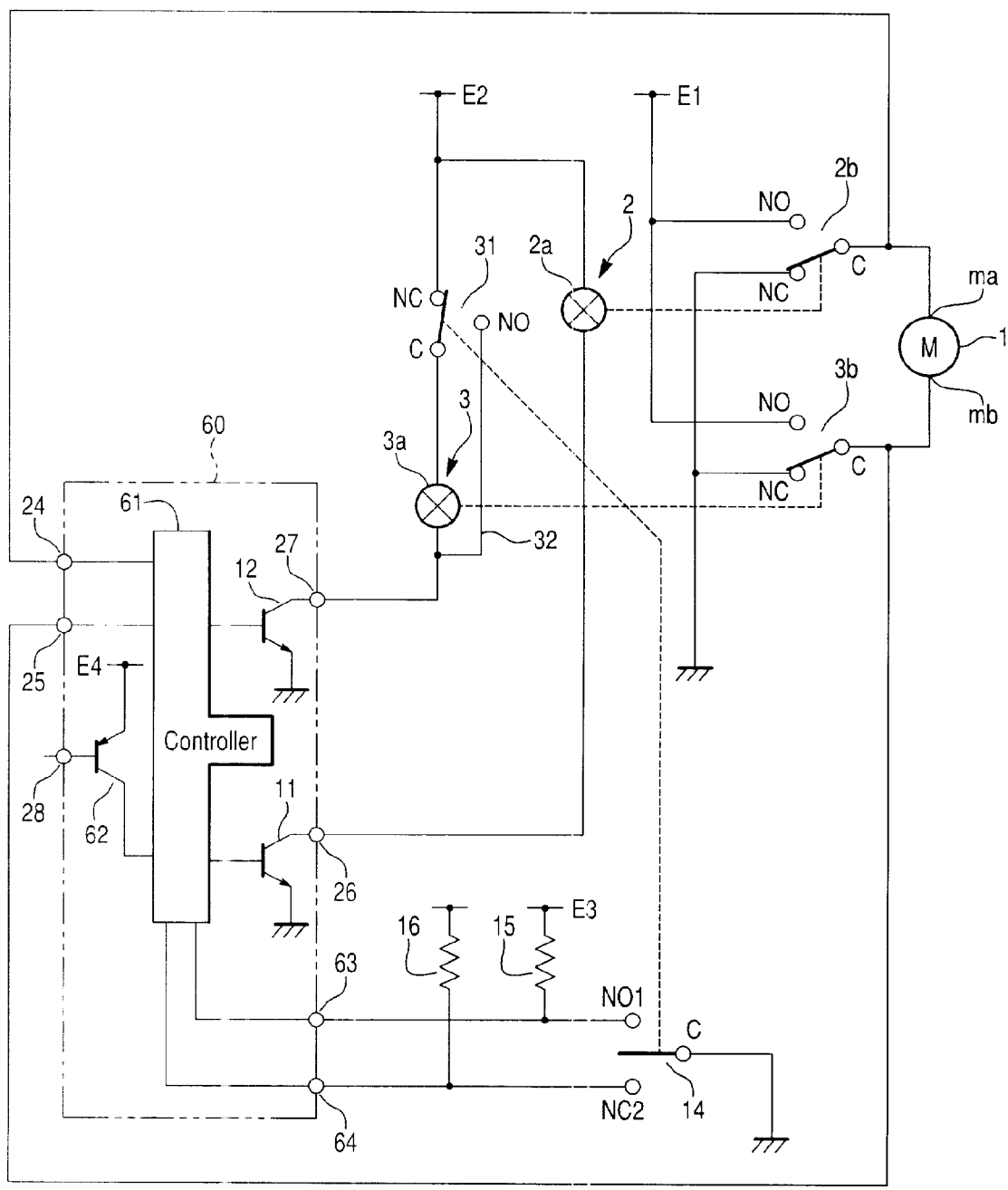
FIG. 4 is a circuit diagram of a motor drive apparatus according to a third embodiment.

FIG. 4 illustrates a third embodiment.

Like the controller 13 shown in FIG. 7, a controller 61 controls the relay control transistors 11, 12 in accordance with the voltages that appear at the two terminals NO1, NO2 of the operating switch 14. The controller 61 further controls automatic opening and closing, performs control to prevent an object from becoming caught in a power window and controls remote operation, as set forth above. Provided within a control unit 60 are the controller 61 and a submersion sensing transistor 62, which are molded in plastic. The base of the transistor 62 is connected to the open terminal 28. In addition to the above-mentioned terminals 24, 25, 28, 26, 27, the control unit 60 is also provided with terminals 63, 64 for connecting the terminals NO1, NO2 of the operating switch 14 to the control unit 60.

A power-supply voltage E4 is being applied to the emitter of transistor 62. If a state is attained that is equivalent to one in which the open terminal 28 is connected to ground via a leakage resistance owing to submersion, the transistor 62 turns on. A voltage substantially equal to the voltage E4 is input to the controller 61.

The controller 61 is programmed so as to execute the malfunction prevention processing described below. If voltage input from the transistor 62 exceeds a threshold voltage, the controller 61 judges that submersion has been detected. If the voltage at the terminal mb of motor 1 that enters from the terminal 25 is the power-supply voltage E1 or a voltage in the vicinity thereof, the controller 61 judges that the motor 1 is rotating in the reverse direction and outputs a control signal (H level) that is for turning on the transistor 11. As a result, the relay coil 2*a* is energized and therefore the terminal ma of motor 1 also attains the power-supply voltage E1, whereby rotation of the motor 1 is stopped.

An arrangement in which the controller 61 is made to execute the following malfunction prevention processing may be adopted. When the controller 61 judges that that submersion has been detected based upon an input signal from the transistor 62 and judges that the motor 1 is being rotated in the forward direction by the voltage at the terminal ma of motor 1 input from the terminal 24, the controller outputs a control signal, which is for turning on the transistor 12, thereby actuating the relay 3.

The shorting circuit is provided in this embodiment as well. The switch 31 of the shorting circuit operates in association with the operating switch 14 in such a manner that when the operating switch 14 is connected to the terminal NO1, the common terminal C of the switch 31 is connected to the normally open contact NO. As a result, when the relay 2 is actuated in an attempt to rotate the motor 1 in the forward direction (to open the window), the ends of the relay coil 3*a* are shorted and the relay 3 is restored.

Figure 5:
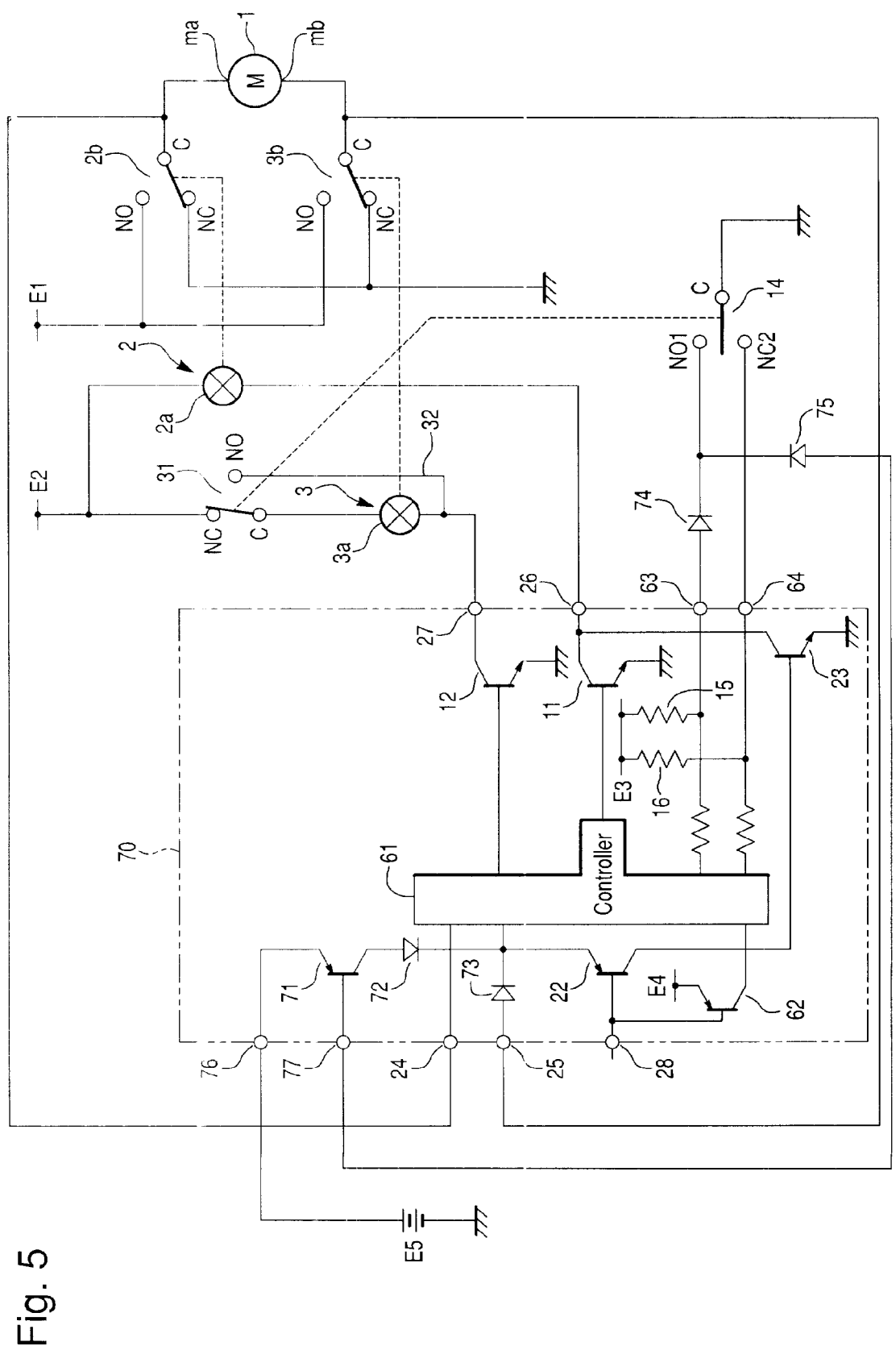
FIG. 5 is a circuit diagram illustrating a modification of the third embodiment.

FIG. 5 illustrates a modification. Here a control unit 70 has two additional functions in comparison with the control unit 60 shown in FIG. 4.

One function is obtained by adding on the malfunction prevention circuitry (transistors 22 and 23) shown in the first embodiment (FIG. 1). As a result, even if the above-described malfunction prevention processing function of controller 61 becomes inoperative, it is possible to prevent a malfunction in which the motor is rotated in the reverse direction owing to submersion.

The other function is to rotate the motor 1 in the forward direction, without the intervention of the controller 61, in operative association with a forward-rotation operation by the operating switch 14. The voltage of a power supply E5 is applied to the emitter of a transistor 71 via a terminal 76. The base of the transistor 71 is connected to the terminal NO1 of the operating switch 14 via a terminal 77 and a diode 75. The collector of the transistor 71 is connected to the emitter of the transistor 22 via a diode 72.

If the operating switch 14 is connected to the terminal NO1, the base of the transistor 71 is connected to ground and the transistor 71, therefore, turns on. If submersion is sensed, the transistor 22 turns on (even if the voltage E1 is not being applied to the terminal 25) and so does the transistor 23, whereby the relay 2 is actuated. Even if the motor 1 is not rotating in the reverse direction, and even if the controller 61 is malfunctioning when submersion occurs, the motor 1 can be rotated in the forward direction by manipulating the operating switch 14. It should be noted that the diodes 72, 73, 74, 75 are for preventing reverse current.

In this modification, the pull-up resistors 15, 16 are molded inside the control unit 70. Thus, what circuits and elements are included inside the control unit (mold) can be changed depending upon design considerations.

In any case, in the foregoing embodiment, the shorting circuit causes the relay coil of a relay that rotates the motor in the reverse direction to be shorted in operative association with operation of an operating switch in a direction that rotates the motor forwardly. However, instead of this arrangement, or in addition thereto, a shorting circuit may be provided for shorting a relay coil that rotates the motor in the forward direction in operative association with operation of the operating switch in a direction that rotates the motor reversely.

What is claimed is:

1. A motor drive apparatus for driving a motor in a forward direction or in a reverse direction by actuating a relay that rotates the motor in the forward direction or a relay that rotates the motor in the reverse direction by supplying power to the motor in response to a forward-rotation command or reverse-rotation command provided by an operating portion, comprising:

submersion sensing means for sensing that at least the operating portion of the motor drive apparatus has become submersed;

first malfunction sensing means for sensing that one relay of said relays, which is for rotating the motor in a predetermined one direction, has been actuated; and first forcible control means for actuating the other relay in response to submersion being sensed by said submersion sensing means and actuation of the one relay being sensed by said first malfunction sensing means.

2. A motor drive apparatus according to claim 1, further comprising:

second malfunction sensing means for sensing that the other relay has been actuated; and second forcible control means for actuating said one relay in response to submersion being sensed by said submersion sensing means and actuation of said other relay being sensed by said second malfunction sensing means.

3. A motor drive apparatus according to claim 1, wherein said motor is a motor for driving an opening and closing body of a vehicle.

4. A motor drive apparatus according to claim 3, wherein rotation of said motor in one direction is rotation in a direction that closes said opening and closing body, and rotation of the motor in the other direction is rotation in a direction that opens said opening and closing body.

5. A motor drive apparatus according to claim 1, further comprising a shorting circuit for establishing a short circuit across a relay coil of the relay that rotates the motor in said one direction, in operative association with manipulation of said operating portion so as to generate a command that rotates the motor in said other direction.

6. A motor drive apparatus having two relays for rotating a motor in a forward or reverse direction by supplying power to the motor, wherein the relays are actuated to rotate the motor in the forward or reverse direction in accordance with the operating state of an operating portion that is for commanding forward or reverse rotation of the motor, comprising:

submersion malfunction sensing means for outputting a submersion malfunction detection signal upon sensing that the motor drive apparatus has been submersed and that one relay of the said relays, which is for rotating the motor in one direction, has been actuated; and forcible control means for energizing a relay coil that is for actuating the other of the said relays, irrespective of the operating state of said operating portion, in response to output of said submersion malfunction detection signal.

7. A motor drive apparatus having two relays for rotating a motor in a forward or reverse direction by supplying power to the motor, wherein the relays are actuated to rotate the motor in the forward or reverse direction in accordance with the operating state of an operating portion that is for commanding forward or reverse rotation of the motor, comprising:

submersion sensing means for outputting a submersion detection signal upon sensing that the motor drive apparatus has become submersed; and forcible control means for actuating both of said relays, irrespective of the operating state of said operating portion, in response to output of said submersion detection signal.

8. A motor drive apparatus according to claim 6, wherein said motor is a motor for driving an opening and closing body of a vehicle.

9. A motor drive apparatus according to claim 8, wherein rotation of said motor in one direction is rotation in a direction that closes said opening and closing body, and rotation of the motor in the other direction is rotation in a direction that opens said opening and closing body.

10. A motor drive apparatus according to claim 6, further comprising a shorting circuit for establishing a short circuit across a relay coil of the relay that rotates the motor in said one direction, in operative association with a shift of said operating portion to a state in which a command that rotates the motor in said other direction is generated.

* * * * *